(12) United States Patent
Peet

(10) Patent No.: US 6,270,912 B1
(45) Date of Patent: Aug. 7, 2001

(54) MULTI-LAYER FILMS WITH CORE LAYER OF METALLOCENE-CATALYZED POLYPROPYLENE

(75) Inventor: Robert G. Peet, Pittsford, NY (US)

(73) Assignee: Mobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/257,628

(22) Filed: Feb. 25, 1999

(51) Int. Cl.⁷ .................................................. B32B 27/32
(52) U.S. Cl. ........................ 428/517; 428/521; 428/910; 264/210.1; 264/210.7
(58) Field of Search ...................... 428/517, 521, 428/523, 910; 264/210.1, 210.7

(56) References Cited

U.S. PATENT DOCUMENTS

| | | | |
|---|---|---|---|
| 3,753,769 | 8/1973 | Steiner | 117/122 |
| 4,214,039 | 7/1980 | Steiner et al. | 428/414 |
| 4,447,494 | 5/1984 | Wagner, Jr. et al. | 428/349 |
| 4,604,324 | 8/1986 | Nahmias et al. | 428/349 |
| 4,794,096 | 12/1988 | Ewen | 502/117 |
| 4,865,908 | 9/1989 | Liu et al. | 428/248 |
| 4,892,851 | 1/1990 | Ewen et al. | 502/104 |
| 4,961,992 | 10/1990 | Balloni et al. | 428/332 |
| 4,975,403 | 12/1990 | Ewen | 502/113 |
| 5,019,447 | 5/1991 | Keller | 428/327 |
| 5,036,034 | 7/1991 | Ewen | 502/117 |
| 5,057,177 | 10/1991 | Balloni et al. | 156/244.11 |
| 5,155,080 | 10/1992 | Elder et al. | 502/152 |
| 5,158,920 | 10/1992 | Razavi | 502/152 |
| 5,162,278 | 11/1992 | Razavi | 502/152 |
| 5,254,394 | 10/1993 | Bothe et al. | 428/212 |
| 5,462,807 | 10/1995 | Halle et al. | 428/500 |
| 5,468,440 | 11/1995 | McAlpin et al. | 264/291 |
| 5,529,843 | 6/1996 | Dries et al. | 428/516 |

*Primary Examiner*—Blaine Copenheaver
(74) *Attorney, Agent, or Firm*—Dennis P. Santini; T. Dean Simmons; William E. Hickman

(57) ABSTRACT

An oriented multi-layer film comprised of a core layer comprising a metallocene-catalyzed substantially isotactic propylene polymer, a first additional layer on a side of the core layer, and a second additional layer on a side of the core layer which side is opposite to the side having the first additional layer. In one embodiment of the invention, the core layer includes a polymerized alicyclic hydrocarbon such as polyterpene.

8 Claims, No Drawings

MULTI-LAYER FILMS WITH CORE LAYER OF METALLOCENE-CATALYZED POLYPROPYLENE

FIELD OF THE INVENTION

The present invention relates to a biaxially oriented film which contains a core layer of metallocene-catalyzed substantially isotactic propylene polymer.

BACKGROUND OF THE INVENTION

Oriented polypropylene films are known for use in packaging. U.S. Pat. No. 4,604,324 to Nahmias et al. discloses multi-layer polypropylene film structures comprising coextruded layers of a base layer of high stereoregularity polypropylene and a skin layer of comparatively low stereoregularity which contains anti-stick additives. In addition, the skin layer can contain up to 10 wt. % of a wax to improve heat seal characteristics or optical properties of the film.

Metallocene-catalyzed propylene polymers are now available, which have low melting temperatures relative to conventional propylene polymers. For this reason, metallocene-catalyzed propylene polymers have been described as useful as the outer layer heat sealable material of multi-layer films in U.S. Pat. No. 5,468,440 (column 6, lines 32 to 41) to McAlpin et al. The McAlpin et al. patent discusses temperatures at which metallocene-catalyzed isotactic polypropylene plaques or cast samples can be stretched in laboratory equipment. Those temperatures, however, are not suitable for continuous orientation processing.

Other multi-layer films in which the advantages of an outer layer of metallocene-catalyzed propylene polymers are described are found in U.S. Pat. Nos. 5,529,843 and 5,462,807. Although the '843 and '807 patents describe multi-layer films in which an outer layer is made from a metallocene-catalyzed propylene polymer, these patents are silent on the use of metallocene-catalyzed propylene polymers in the core layer of a multi-layer film.

U.S. Pat. No. 5,254,394 to Both et al., discloses a polyolefin film for packaging comprising an isotactic polypropylene base layer and a top layer of syndiotactic polypropylene which has high sealed-seam strength and excellent optical properties. The top layer can contain lubricant additives, such as waxes at levels of up to 2 wt. % relative to each other.

Metallocene-catalyzed polypropylene polymers have been developed under the product names NOVALEN M by BASF, FINACENE by Fina, and EXCEED by Exxon, for example. These metallocene-catalyzed isotactic polypropylenes share the beneficial characteristics of having a very narrow composition distribution. Thus, a large portion of the molecules have a level of atactic defects within a compositionally narrow range, for example, rather than a broad range of atactic defect levels averaging out at the desired level.

These same metallocene-catalyzed isotactic polypropylenes, however, also share the characteristic of having a very narrow molecular weight distribution. That is, a large portion of their molecules have a particular chain length. On the other hand, the more traditionally used isotactic polypropylenes have a broad range of chain lengths, averaging out at the desired level. For good operability in the OPP (oriented polypropylene) process, it has been shown that a broad molecular weight distribution has been highly preferred, if not absolutely necessary. The high molecular weight tails of the Ziegler-Natta catalyzed resins tend to distribute the stretching forces more uniformly, preventing stress concentrations, and ultimately providing more uniform orientation and improved operability. Thus, the metallocene-catalyzed isotactic polypropylene polymers have a narrow composition distribution, which is looked upon favorably for film properties, and a narrow molecular weight distribution, which is looked upon negatively for operability in the OPP process.

For this reason, multi-layer films disclosed in the prior art, heretofore, have generally used traditional Ziegler-Natta catalyzed, broad molecular weight distribution polymers in the core, to distribute orientation stresses more uniformly and avoid film breakage during orientation, relegating the metallocene-catalyzed polypropylenes, with their desired properties, to layers on one or both sides of the Ziegler-Natta catalyzed core resin.

At conditions known to be in use within the general OPP industry, as recommended by sources recognized as knowledgeable in the operation of OPP orientation lines, orientation of an OPP line with metallocene-catalyzed isotactic polypropylene as the core resin would not be expected to proceed as well as orientation when using a broad molecular weight range Ziegler-Natta catalyzed resin.

Surprisingly, we have now discovered that films having metallocene-catalyzed isotactic polypropylene resin as the core material can be produced satisfactorily under certain conditions, discussed more fully below.

SUMMARY OF THE INVENTION

The present invention is directed to an oriented multi-layer film which comprises:

(a) a core layer comprising a metallocene-catalyzed substantially isotactic propylene polymer;

(b) a first additional layer on a side of the core layer; and (c) a second additional layer on a side of the core layer which side is opposite to the side having the first additional layer.

In one modification, the film of the present invention has a Ziegler-Natta catalyzed polypropylene layer on one or both sides of the core to improve operability.

Further, the present invention is directed to a process for making a multi-layer film, wherein the process comprises:

(a) extruding a core layer comprising a metallocene-catalyzed substantially isotactic propylene polymer;

(b) coextruding a first additional layer on a side of the core layer;

(c) coextruding a second additional layer on the side opposite to the side having the first additional layer;

(d) cooling the coextruded multi-layer film; and then (e) orienting the film in at least the machine direction (MD), wherein rolls operating at a temperature greater than about 110° C. are used in the machine direction orientation.

DETAILED DESCRIPTION OF THE PREFERRED EMBODIMENTS

General conditions recommended for use within the OPP industry typically include running the MD stretch at temperatures in the 107° C. to 148° C. range and rolls following the MD stretch at a reduced temperature, such as 80–110° C. Attempts to run metallocene-catalyzed isotactic polypropylene core at these temperatures, however, resulted in a number of splits. The present invention is founded on the discovery that running the line with all the MD rolls at temperatures in the range of > about 110° C. resulted in satisfactory operability of the OPP process and the production of useful films.

The core layer of the multi-layer film comprises a metallocene-catalyzed substantially isotactic propylene polymer. The phrase "substantially isotactic propylene polymer" or "substantially isotactic polypropylene" as used in the present invention generally refers to propylene polymers which have an isotacticity of 85% or greater (as measured by solubility in xylene). Exemplary isotactic propylene polymers and/or methods for making such polymers are described in, e.g., the following patent documents: U.S. Pat. Nos. 5,529,843 (particularly column 4, lines 52 to 62); 5,162,278; 5,158,920; 5,155,080; 5,036,034; 4,975,403; 4,892,851; and 4,794,096, all of which are incorporated herein by reference in their entirety.

As indicated above, metallocene-catalyzed polypropylene polymers have been developed under the product names NOVALEN M by BASF, FINACENE by Fina, and EXCEED by Exxon, for example. These metallocene-catalyzed isotactic polypropylenes have relatively narrow composition and molecular weight distributions.

The propylene polymers used in the present invention can, optionally, contain other monomeric units as in the case of a copolymer of propylene and ethylene or α-olefin having from 4 to 20 carbon atoms such as butene-1, pentene-1, hexene-1, heptene-1, 4-methylpentene-1, etc. Generally, the amount of monomer other than propylene is no more than 10% by weight of the entire polymer. In one commonly used modification, a copolymer of ethylene and propylene is used in the core layer of OPP film, which contains about 0.5% ethylene by weight in the entire polymer.

The propylene polymer has a melting point of about 140° C. or higher, more typically a melting point of 150° C. or higher. The melt flow rate usually ranges from about 0.5 g/10 min to about 15 g/10 min at 230° C., more typically about 1.5 g/10 min to about 4 g/10 min at 230° C. The melt flow rate is measured by the standard ASTM D1238 method.

The core layer of the film is of sufficient thickness to provide bulk properties, such as barrier, stiffness, etc. that are desired for product protection and good performance on packaging equipment. Preferably, the thickness ranges from about 60% to about 95%, based on the thickness of the entire film structure.

The additional layer(s) of the present invention may be any of the coextrudable, biaxially orientable film-forming resins known in the art. Such materials include substantially isotactic polypropylene, substantially syndiotactic polypropylene, copolymers with ethylene and terpolymers which include monomers such as ethylene and/or butene-1 and/or higher alpha-olefins. The substantially syndiotactic polypropylenes include those having a syndiotacticity of about 70% or greater based on racemic pentads (measured according to $^{13}$C NMR spectroscopy). Typical copolymers are ethylene-propylene random copolymers, ethylene-butene-1 copolymers, propylene-butylene random copolymers, and ethylene-propylene block/impact copolymers. Typical terpolymers are random ethylene-propylene-butene-1 terpolymers, and block terpolymers of ethylene, propylene and butene-1. As indicated above, the polymers contained in the additional layer(s) include, but are not limited to, both Ziegler-Natta and metallocene catalyzed polypropylene. Alternative and useful thermoplastic materials for the additional layer(s) include polyamides and polyesters. Blends of any of the foregoing homopolymers, copolymers and terpolymers are also contemplated. As stated above, the additional layer(s) can be metallocene-catalyzed polypropylene.

Ethylene-propylene-butene-1 random terpolymers appropriate for use in the additional layer(s) of the present invention include those containing 0.25–7 weight percent random ethylene and 0.25–35 weight percent random butene-1, with the balance being made up of propylene. The amounts of the random ethylene and butene-1 components in these terpolymers are typically in the range of 5 to 25 weight percent (ethylene plus butene-1) based on the total amount of the copolymer.

The copolymers and terpolymers typically have a melt flow rate in the range of about 5 to 10 with a density of about 0.9 and a melting point in the range of about 105 to about 130° C.

The polymers of the additional layer(s) of the film can also be fabricated from any polymers, copolymers or terpolymers or blends of homopolymers and blends of copolymer(s) and homopolymer(s) which have heat seal properties. Several of the materials identified above are illustrative of heat sealable copolymers which can be used in the present invention.

In another aspect of the invention, the additional layer is derived from polyethylene. The polyethylene can be low density polyethylene (LDPE), linear low density polyethylene (LLDPE), medium density polyethylene (MDPE) or high density polyethylene (HDPE). These ethylene polymers typically have a melt index ranging from about 0.3 to about 15, measured by ASTM D1238. The low density polyethylenes should have a density of about 0.88 to about 0.93 g/cm$^3$. Linear materials may have a density as high as 0.94 g/cm$^3$, often ranging from 0.90 to 0.94 g/cm$^3$, with a melt index of about 1 to about 10. The linear low density polyethylenes may be derived from ethylene together with other higher comonomers such as butene-1, hexene-1, or octene-1. Typically it is useful to use HDPE as the outer layer as it enhances film toughness. HDPE has a density of greater than about 0.941 g/cm$^3$, typically from about 0.941 to about 0.965 g/cm$^3$. High density polyethylene suitable for use as the outer layer is described in Bakker, Ed. "The Wiley Encyclopedia of Packaging Technology, pp. 514 to 523 (1986).

Each additional layer can range in thickness from about 0.01 mil to about 0.20 mil, specifically from about 0.02 mil to about 0.06 mil.

There can be more than one layer coextruded on each side of the core. That is, one or more layers can be added to the surface of the core layer. Films having such a multi-layer structure are represented, in simplified form, as having a structure "ABCDE" where "C" represents a core layer, "B" represents an additional layer adjacent to the core layer and "A" represents a further additional layer or skin layer applied to the outer surface of layer "B." In such a film structure, the additional layer "B" can be referred to as a "tie-layer" or an "intermediate layer." Layers "A" and "B" can be the same or different. Similarly, "D" and "E" represent additional layers on the other side of the core layer, and they may be the same or different. Layers "B" and "D" may be the same or different, and layers "A" and "E" may be the same or different. Additionally, structures containing more than five layers are contemplated, e.g. seven, nine, or more layers.

In order to modify or enhance certain properties of the multi-layer films of the present invention for specific end-uses, it is possible for one or more of the layers to contain appropriate additives in effective amounts. Preferred additives include antistatic agents, antiblocking agents, lubricants, stabilizers and/or one or more of a class of hydrocarbon resins, such as alicyclic hydrocarbon resins, which are known to improve barrier properties. Such additives are further described in U.S. Pat. No. 5,254,394, which is incorporated herein by reference. It is useful to incorporate additives such as wax, finely divided inorganic antiblock particles, silicone oil, and silicone spheres such as non-migratory particulate crosslinked hydrocarbyl-substituted polysiloxane slip agents, such as TOSPEARL which is marketed world-wide by Toshiba Silicone Co., Ltd. and in the United States by General Electric. The alicyclic hydrocarbons include polyterpenes, petroleum resins and "hard" resins employed in the films, to improve barrier properties and sealability. PICCOLYTE and REGALREZ from Hercules, ZONTEC from Arizona Chemicals Co., ARKON from Arakawa Chemical, ESCOREZ from Exxon are some of the commercial materials that are available. Other additives that can be incorporated into one or more layers of the film include nucleators, such as MILLAD 3938 from Milliken for crystal structure and carbon black for brightening.

Finely divided inorganic antiblock materials, contemplated above, include Syloid, a synthetic amorphous silica gel, having a composition of 99.7% $SiO_2$; diatomaceous earth having a composition of, for example, $SiO_2$ 92%, $Al_2O_3$ 3.3%, $Fe_2O_3$ 1.2%, which can be obtained in various grades with average particle sizes ranging from about 5 microns to about 10 microns, which particles are porous and irregularly shaped; dehydrated kaolin clays, such as KAOPOLITE SF which has the composition $SiO_2$ 55%, $Al_2O_3$ 44%, $Fe_2O_3$ 0.4%, which has an average particle size of about 0.7 microns, and whose particles are thin flat platelets; and synthetic precipitated silicates, SIPERNAT 44, for example, having a composition of $SiO_2$ 42%, $Al_2O_3$ 36%, $Na_2O$ 22%, which has an average particle size of about 3–4 microns, and which particles are porous and irregularly shaped. The amount of antiblock ranges, typically from about 0.002 to about 0.5 weight % based upon the weight of the polymer.

Typically, a commercially available intensive mixer, such as those of the Bolling- or Banbury-type can be employed in mixing a concentrate of the finely divided inorganic material and the selected polymer until there is a uniform dispersion of the inorganic material in the polymer.

The alicyclic hydrocarbon is advantageously used to improve the barrier properties of the film. The amount of alicyclic hydrocarbon employed in a layer of the film typically ranges from about 3 to about 15 wt. % based upon the weight of the layer.

Also, one or more of the exposed layers of the multi-layer films of the present invention can be surface-treated to render the films receptive to printing inks, adhesives and/or coatings. The surface treatment can be carried out by any method known in the art such as corona discharge treatment or flame treatment.

Optionally a coating may be applied to one or both of the exposed surfaces of the outermost layers of the film. Prior to application of the coating material, the film may be surface treated or may be primed with a primer layer. Appropriate coatings contemplated include acrylic coatings such as those described in U.S. Pat. Nos. 3,753,769 and 4,865,908, both of which are incorporated herein by reference, and PVDC coatings such as those described in U.S. Pat. Nos. 4,214,039; 4,447,494; 4,961,992; 5,019,447 and 5,057,177, all of which are incorporated herein by reference. A vinyl alcohol polymer may also be used as a coating composition, such as VINOL 325.

Appropriate primer materials are poly(ethyleneimine), epoxy primers, and the like.

The outer surface of the film is preferably treated as noted above to increase its surface energy and therefore insure that the coating layer will be strongly adherent thereto thereby reducing the possibility of the coating peeling or being stripped from the film. This treatment can be accomplished employing known techniques, such as, for example, film chlorination, i.e., exposure of the film surface to aqueous chlorine, treatment with oxidizing agents such as chromic acid, hot air or steam treatment, and the like. Although any of these techniques are effectively employed to pretreat the film surface, a particularly desirable method of treatment is the so-called electronic treatment method which comprises exposing the film surface to a high voltage corona discharge while passing the film between a pair of spaced electrodes. After electronic treatment of the film surface, the coating composition is then applied thereto.

The exposed treated or untreated surfaces of layer(s) (b) and/or (c) identified in the Summary of Invention of the inventive film may have applied to them coating compositions, as mentioned above, and/or substrates such as another polymer film or laminate; a metal foil such as aluminum foil; cellulosic webs, e.g. numerous varieties of paper such as corrugated paperboard, craft paper, glassine, cartonboard; nonwoven tissue, e.g., spunbonded polyolefin fiber, melt-blown microfibers; a metallizing layer, etc. The application may employ a suitable adhesive, e.g., a hot melt adhesive such as low density polyethylene, ethylene-methacrylate copolymer, water-based adhesives such as polyvinylidene chloride latex, and the like.

The extruded film can be stretched in the machine direction, coated with the coating composition and then stretched perpendicularly in the transverse direction. In yet another embodiment, the coating can be carried out after biaxial orientation is completed.

The coating composition should be applied in such amount that there will be deposited upon drying a smooth, evenly distributed layer, generally on the order of from about 0.01 to about 0.2 mil thickness (equivalent to about 0.2 to 3.5 g per 1000 sq. in. of film). In general, the thickness of the applied coating is such that it is sufficient to impart the desired seal sealability and/or oxygen and/or water vapor barrier characteristics to the resulting film. Generally, the coating comprises 1 to 25 wt %, preferably 7 to 15 wt % of the entire coated film composition. The coating on the film is subsequently dried by hot air, radiant heat or by any other convenient means.

There are many advantages to the film of the invention. However, most notable is the advantageous barrier properties which permit the film to be adapted to controlled atmosphere packaging.

Usually the film of the invention has a total thickness ranging from about 0.4 mil to about 2.5 mil, specifically from about 0.5 mil to about 2.0 mil. The thickness relationship of the layers can be important. In particular, the core layer is a relatively thick layer which constitutes about 40 to about 95 percent of the total film thickness, the intermediate layer is of a thickness ranging from about 0 to about 50 percent of the total film thickness while any outer skin layer might range from about 1 to about 15 percent of the total film thickness.

Multi-layer films may be prepared employing commercially available systems for coextrusion.

It is preferred that all layers of the multi-layer film structures of the present invention be coextruded. Thereafter, the film is biaxially oriented. Specifically, the polymers are brought to the molten state and coextruded from a conventional extruder through a flat sheet die, the melt streams are combined in an adapter prior to being extruded from the die or within the die. After leaving the die, the multi-layer film is chilled and the quenched sheet is reheated and oriented.

Preferably, the film is oriented by biaxially stretching the film. The film can be oriented by stretching from about 3.5 to about 6.5 times in the machine direction at temperatures ranging from about 110° C. to about 150° C. and from about 5 to about 14 times in the transverse direction (TD) at temperatures ranging from about 152° C. to about 165° C.

As discussed above, general conditions recommended for use within the OPP industry typically include running the MD stretch at temperatures in the 107° to 148° C. range and rolls following the MD stretch at a reduced temperature, such as 80–110° C. Attempts to run metallocene-catalyzed isotactic polypropylene core at these temperatures, however, resulted in a number of splits. We have found that running the line with all the MD rolls at temperatures in the range of >about 110° C. resulted in satisfactory operability of the process. Coextruded films with a metallocene-catalyzed isotactic polypropylene core may be produced at steady state with no splits in the stretching process at several different TD stretch temperatures within the 152–165° C. range.

The following examples illustrate the effectiveness of the present invention without limiting the scope thereof.

COMPARATIVE EXAMPLE 1

A film was made in accordance with the procedures for producing conventional OPP films. Specifically, the process and equipment were set up to make a film with a standard Ziegler-Natta catalyzed isotactic polypropylene core layer. A Ziegler-Natta catalyzed isotactic polypropylene designated Fina 3371, manufactured by Fina Oil & Chemical Co., was brought to the molten state at 250° C. and extruded to the core layer through a flat sheet die. On both sides of the core layer, layers of the same standard Ziegler-Natta catalyzed isotactic polypropylene were coextruded. Additionally, skin layers of lower melting polyolefin terpolymers, namely XPM 7702 and XPM 7510, manufactured by Chisso Corporation, were coextruded on the opposite outsides of these intermediate polypropylene layers. After leaving the die, the multi-layer film was chilled, and the quenched sheet was then reheated. Thereafter, the multi-layer film was oriented about 5 times in the machine direction at a temperature of about 130° C. and about 8~9 times in the transverse direction at a temperature of about 160° C.

The main properties of the multi-layer film were measured and determined, as reported in Table 1 below.

EXAMPLE 1

In this example, a metallocene catalyzed isotactic polypropylene under development by Fina, designated Finacene EOD 97-09, was used.

The production process of Comparative Example 1 was repeated, except the Ziegler-Natta catalyzed isotactic polypropylene core resin was replaced with a mixture of a metallocene-catalyzed isotactic polypropylene designated Finacene EOD 97-09 and 1000 ppm of an anti-static agent designated Armostat 410.

The operability of the equipment during the production of the film structure including the metallocene-catalyzed isotactic polypropylene core was good compared to the operability during the production of the film using the Ziegler-Natta catalyzed polypropylene.

In this example, there were no film splits. Main film properties are shown in Table 1 below.

TABLE 1

|  | Optics | | Barrier | |
|  | Haze[1] | Gloss[2] | WVTR[3] | % Improvement in WVTR |
| --- | --- | --- | --- | --- |
| Comparative Example 1 | 1.4 | 88.3 | 0.41 | |
| Example 1 | 1.6 | 86.6 | 0.40 | 2.4 |

[1]% light transmission measured in accordance with ASTM D1003
[2]% light reflected at an angle of about 45°, measured in accordance with ASTM D2457
[3]water vapor transmission rate, g/100 in$^2$/day, measured in accordance with ASTM F1249

As seen from Table 1, the improvement in WVTR for film structures including the metallocene-catalyzed isotactic polypropylene was about 2.4%.

What is claimed is:

1. An oriented multi-layer film which comprises:
   (a) a core layer comprising a metallocene-catalyzed substantially isotactic propylene polymer;
   (b) a first additional layer on at least one side of the core layer; and
   (c) a second additional layer on a side of the core layer which side is opposite to the side having the first additional layer, wherein the first and second additional layers are Ziegler-Natta catalyzed polypropylene.

2. The oriented multi-layer film of claim 1, wherein the substantially isotactic propylene polymer is selected from the group consisting of substantially isotactic polypropylene, a copolymer of propylene and ethylene, and a copolymer of propylene and an α-olefin having from 4 to 20 carbon atoms.

3. The oriented multi-layer film of claim 1, wherein the substantially isotactic propylene polymer has a melting point of about 140° C. or higher and a melt flow rate of about 0.5 g/10 minutes to about 15 g/10 minutes.

4. The oriented multi-layer film of claim 1, wherein the core layer and/or the additional layer(s) contain an additive selected from the group consisting of antistatic agents, antiblocking agents, brighteners, lubricants, nucleating agents, stabilizers, and/or one or more hydrocarbon resins.

5. The oriented multi-layer film of claim 1, wherein the core layer and/or the additional layer(s) contain an additive selected from the group consisting of wax, finely divided inorganic antiblock particles, silicone oil, non-migratory particulate crosslinked hydrocarbyl-substituted polysiloxane, alicyclic hydrocarbons, and carbon black.

6. The oriented multi-layer film of claim 1, wherein at least one surface thereof is subjected to a corona discharge treatment or flame treatment.

7. The oriented multi-layer film of claim 1, wherein at least one surface thereof contains a coating or primer layer, is metallized, or is laminated to another substrate.

8. A process for producing the multi-layer film of claim 1 comprising:
   (a) coextruding the core layer comprising a metallocene-catalyzed substantially isotactic propylene polymer;
   (b) coextruding the first additional layer on a side of the core layer;
   (c) coextruding the second additional layer on the side opposite to the side having the first additional layer;
   (d) cooling the coextruded multi-layer film; and
   (e) orienting the film in at least the machine direction using rolls, wherein the rolls operate at a temperature greater than about 110° C.

* * * * *